(12) United States Patent
DiGonis

(10) Patent No.: US 6,390,537 B1
(45) Date of Patent: May 21, 2002

(54) VEHICLE ADAPTED FOR TAXICAB AND LIVERY CAB PURPOSES

(76) Inventor: Michael K. DiGonis, 185 Rochelle St., Bronx, NY (US) 10464

( * ) Notice: Subject to any disclaimer, the term of this patent is extended or adjusted under 35 U.S.C. 154(b) by 0 days.

(21) Appl. No.: 09/585,841

(22) Filed: Jun. 1, 2000

(51) Int. Cl.[7] .............................. B60J 7/00; B60J 10/00; B60K 37/00; B60K 2/00; B60N 3/00
(52) U.S. Cl. ........................ 296/185; 296/183; 29/401.1
(58) Field of Search ................................. 296/185, 183, 296/64, 65.04, 25, 188; 29/401.1; 414/537

(56) References Cited

U.S. PATENT DOCUMENTS

| | | | |
|---|---|---|---|
| 1,185,867 A | * | 6/1916 | Bennett |
| 1,279,609 A | * | 9/1918 | Taketoshi |
| 1,342,138 A | * | 6/1920 | Ware |
| 1,518,045 A | * | 12/1924 | Bauer |
| 2,591,380 A | * | 4/1952 | Schreiner |
| 2,816,794 A | | 12/1957 | Temp ........................... 296/28 |
| 2,940,768 A | * | 6/1960 | Thompson et al. |
| 3,759,566 A | * | 9/1973 | Sobey et al. |
| 4,231,144 A | | 11/1980 | Bernacchia, Jr. ........... 29/401.1 |
| 4,457,555 A | | 7/1984 | Draper ........................ 296/186 |
| 4,589,181 A | | 5/1986 | Phillips ..................... 29/401.1 |
| 4,599,780 A | | 7/1986 | Rohrbacher ................ 29/401.1 |
| 4,654,946 A | | 4/1987 | Phillips ..................... 29/401.1 |
| 4,847,972 A | | 7/1989 | Anderson et al. .......... 29/401.1 |
| 4,865,378 A | | 9/1989 | Filtri et al. .................. 296/197 |
| D315,046 S | * | 2/1991 | Abrams |
| 5,114,169 A | | 5/1992 | Botkin et al. ............. 280/423.1 |
| 5,288,124 A | | 2/1994 | Ward ........................... 296/183 |
| 5,301,997 A | | 4/1994 | Cudden ....................... 296/183 |
| 5,305,512 A | | 4/1994 | Ward .......................... 29/401.1 |
| 5,325,558 A | * | 7/1994 | Labreche |
| 5,671,496 A | * | 9/1997 | Smith |
| 5,725,239 A | | 3/1998 | De Molina ................. 280/711 |
| 6,065,798 A | * | 5/2000 | Sankrithi |

FOREIGN PATENT DOCUMENTS

| | | | |
|---|---|---|---|
| GB | 2 137 938 A | * | 10/1984 |
| GB | 2 276 128 A | * | 9/1994 |

\* cited by examiner

Primary Examiner—Joseph D. Pape
Assistant Examiner—Scott Carpenter
(74) Attorney, Agent, or Firm—Eugene Stephens & Associates

(57) ABSTRACT

A passenger cab and livery vehicle is adapted from a pickup truck cab and frame by removing part of the original frame aft of the cab and replacing it with an extended frame connected to the original frame and extending aft in a long flat region supporting a passenger cabin floor. A cabin mounted on the extended frame can receive and accommodate wheelchair passengers through a passenger door wide enough for a wheelchair. A principal passenger seat faces aft in the passenger cabin behind the cab to protect the passengers in a frontal collision, and a second passenger seat can be mounted on a rear axle clearance region aft of the flat cabin floor to face forward.

15 Claims, 7 Drawing Sheets

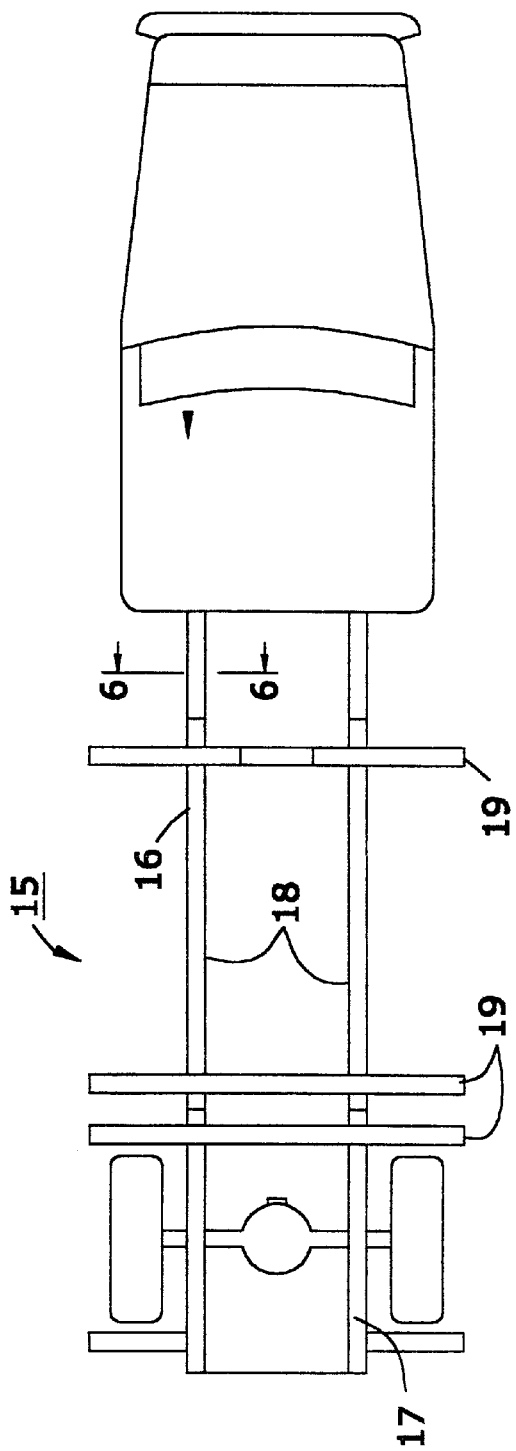
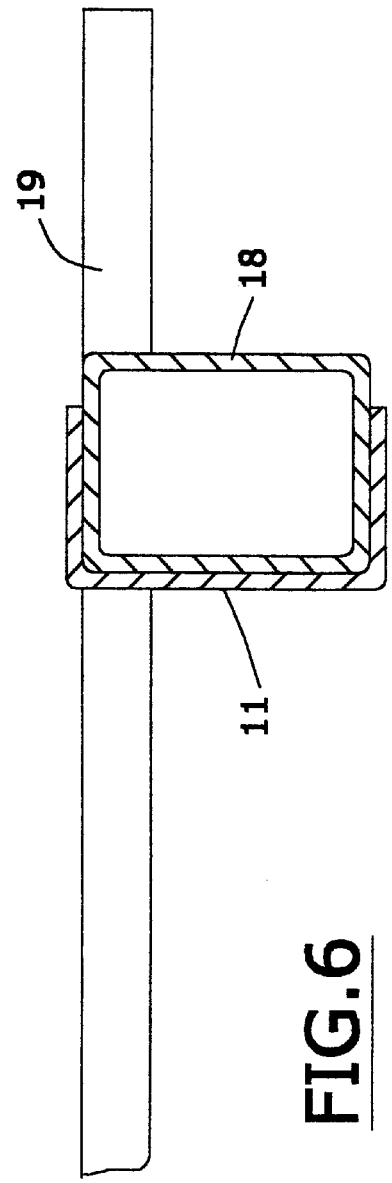
FIG.5
FIG.6

VEHICLE ADAPTED FOR TAXICAB AND LIVERY CAB PURPOSES

TECHNICAL FIELD

Taxicabs and livery vehicles

BACKGROUND

Ordinary sedans are used for most taxicabs and livery vehicles, even though they have several disadvantages, including danger to the passengers who ride in a rear seat facing forward where they are vulnerable to injury from any head-on collision. Ordinary sedans also cannot accommodate wheelchair passengers, and they do not offer adequate protection to the driver from gunfire from the rear seat. Ordinary sedans are also not made ruggedly enough to endure the many passenger miles desired of taxi and livery vehicles pounding over potholed streets.

My invention aims at meeting these needs with a vehicle especially adapted for taxicab and livery cab purposes. My vehicle will accept wheelchair passengers; will transport passengers more safely; and is especially designed for ruggedness, durability, and safety of both the driver and the passengers.

SUMMARY OF THE INVENTION

My taxicab and livery cab vehicle is derived from a pickup truck cab and frame that is especially modified for passenger-carrying purposes. An original portion of the pickup truck frame after the cab is removed and a substitute frame is connected with the original frame to extend aft from the cab through a long level region to a rear axle clearance region. A passenger cabin is mounted on the frame extension aft of the cab and has a wide level floor forward of the rear axle clearance region. A principal passenger seat is arranged in the passenger cabin behind the cab to face rearwardly for improved safety protection of passengers from any forward collision. The flat floor aft of the principal passenger seat and forward of the rear axle clearance region is wide enough to receive and accommodate a wheelchair passenger. Another passenger seat can be arranged on the rear axle clearance region to face forward, and a luggage compartment is located at the rear of the passenger cabin.

A wheelchair ramp to aid ingress and egress of wheelchairs is stored in a pocket forward of the principal passenger seat and aft of the cab. The ramp is preferably made of bullet-resistant material to protect the driver from bullets fired forward from the passenger cabin.

A compact suspension for the rear axle is preferably pneumatic for durability and improved performance and to allow the vehicle to kneel down when receiving or delivering wheelchair passengers. The compact rear suspension also occupies a much smaller portion of the extended frame than is occupied by the leaf spring suspension of the rear axle of a pickup truck. Many other safety and convenience features for both passengers and driver are facilitated by the inventive way of adapting a pickup truck cab and frame to serve as a taxicab and livery vehicle.

DRAWINGS

FIG. 1 schematically illustrates a pickup truck cab and original frame with a leaf spring rear suspension, as is known in the prior art.

FIG. 2 schematically illustrates the pickup truck cab and frame of FIG. 1, with a rear portion of the frame removed aft of the cab.

FIG. 3 schematically shows the pickup truck cab and frame of FIG. 2 with an extended frame connected to the original frame to receive a passenger body.

FIG. 4 schematically shows the pickup truck cab and extended frame of FIG. 3 with a passenger body mounted behind the cab.

FIG. 5 is a fragmentary plan view of a pickup truck cab and extended frame on which a passenger cabin can be mounted.

FIG. 6 is a fragmentary cross-sectional view of the frame of FIG. 5, taken along the line 6—6 thereof to show a connection between new and old parts of the frame.

DETAILED DESCRIPTION

Figure 1:
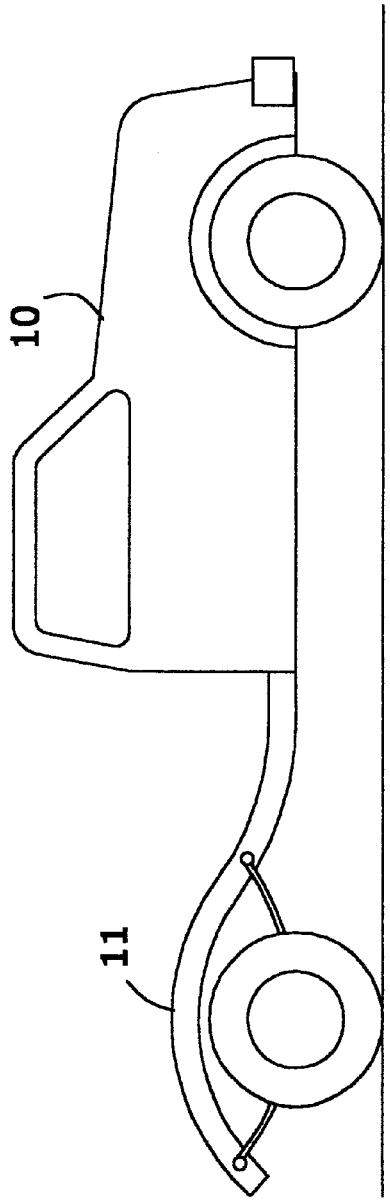
Figure 2:
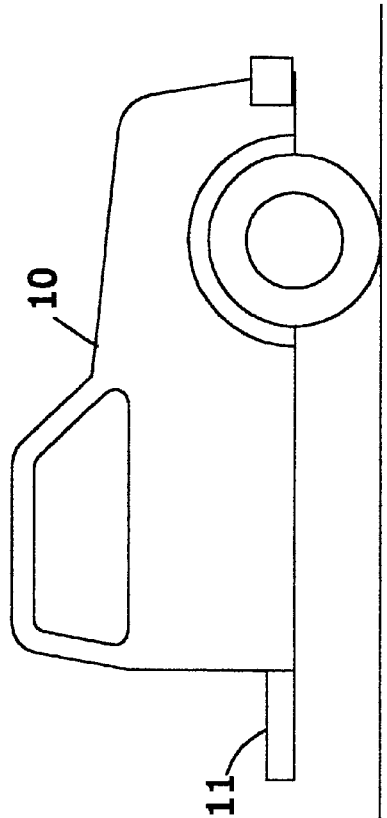
Figure 3:
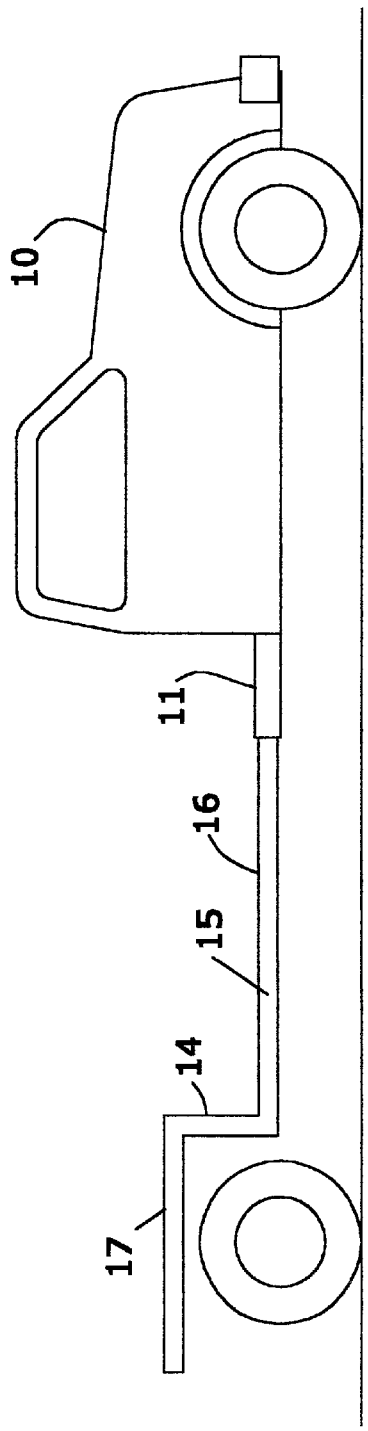
Figure 4:
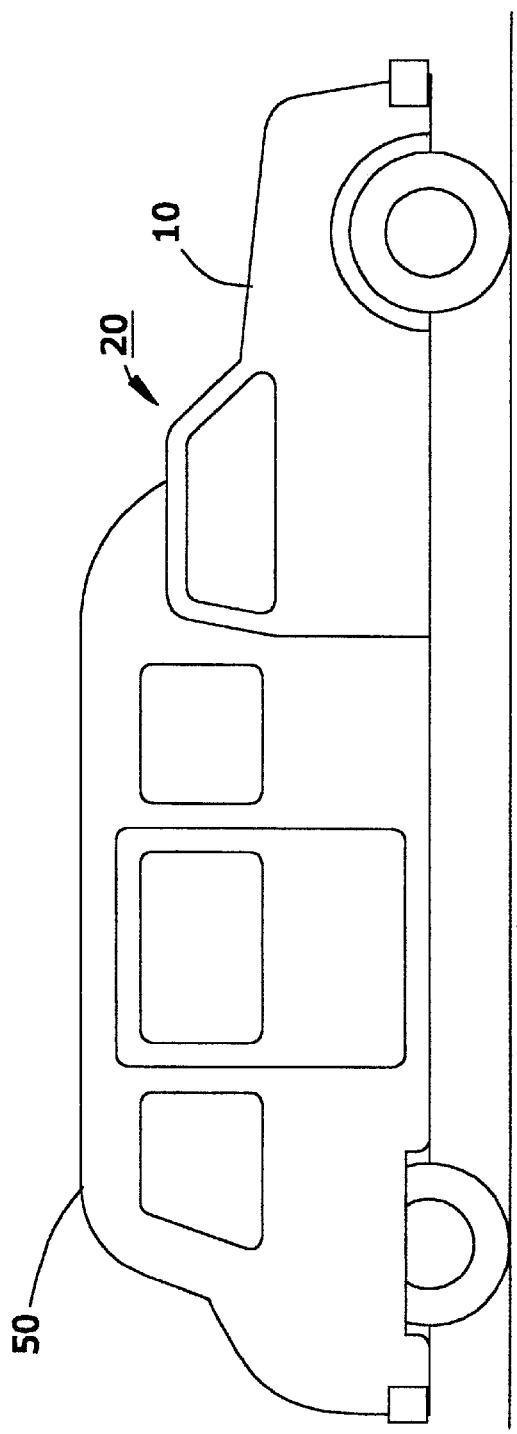

A basic way of adapting a vehicle for taxicab and livery purposes is shown in the schematic views of FIGS. 1–4. These illustrate a sequence of steps in converting a pickup truck cab 10 and frame 11, as shown in FIG. 1, into a taxicab and livery vehicle 20, as shown in FIG. 4. The intermediate steps involve cutting away a portion of the original frame 11 aft of cab 10, as shown in FIG. 2, and adding an extended frame 15, as shown in FIG. 3. The extended frame 15 has a flat level region 16 and a rear axle clearance region 17. Extended frame 15 then provides a mount for passenger cabin 50, which can afford the desired advantages of the invention.

Although any pickup truck can be used for cab 10 and frame 11, present models of compact pickup trucks are preferred for being about the right size for taxicab and livery purposes. Frame 11 of a pickup truck has a curving arch shape over a rear axle clearance region and mounts a leaf spring suspension for a rear axle. Frame 11 is also formed of channels.

Extended frame 15 is preferably formed of box beams and does not have a curved arch over a rear axle region. It is possible to select a size of box beam 18 that can fit within a channel of frame 11 to make a secure welded connection between frame extension 15 and original frame 11, as best shown in FIG. 6.

The flat level region 16 of frame extension 15 preferably extends aft at the height of original frame 11 under cab 10 to support a floor of passenger cabin 50. Cross bars or rails 19 are preferably welded laterally of box beams 18 to provide support for cabin 50. Use of box beams 18 and cab support rails 19 allows mounting of large and durable body bushings supporting cabin 50 throughout the many miles of vibration to be endured.

Rear axle clearance region 17 preferably rises from flat floor-supporting region 16 in an abrupt step 14, making rear axle clearance region 17 much more compact than the arch shape of original frame 11 of FIG. 1. A compact rear axle suspension system that does not require a leaf spring can be mounted in clearance region 17 without invading flat floor space 16.

Passenger cabin 50 is preferably formed of fiberglass, but can also be made of other materials. It is configured to fit on extended frame 15 and preferably overlaps the roof of cab 15 and terminates at the rear of rear axle clearance region 17.

Figure 7:
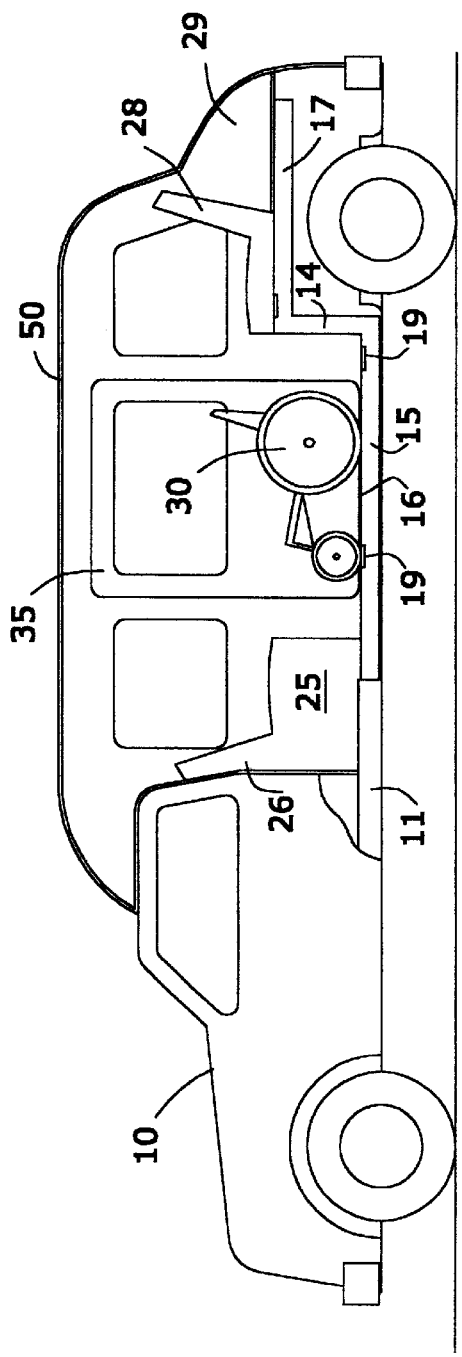
FIG. 7 is a partially schematic and partially cutaway view of a taxicab and livery vehicle according to the invention showing passenger seats and wheelchair carrying capacity.
Figure 8:
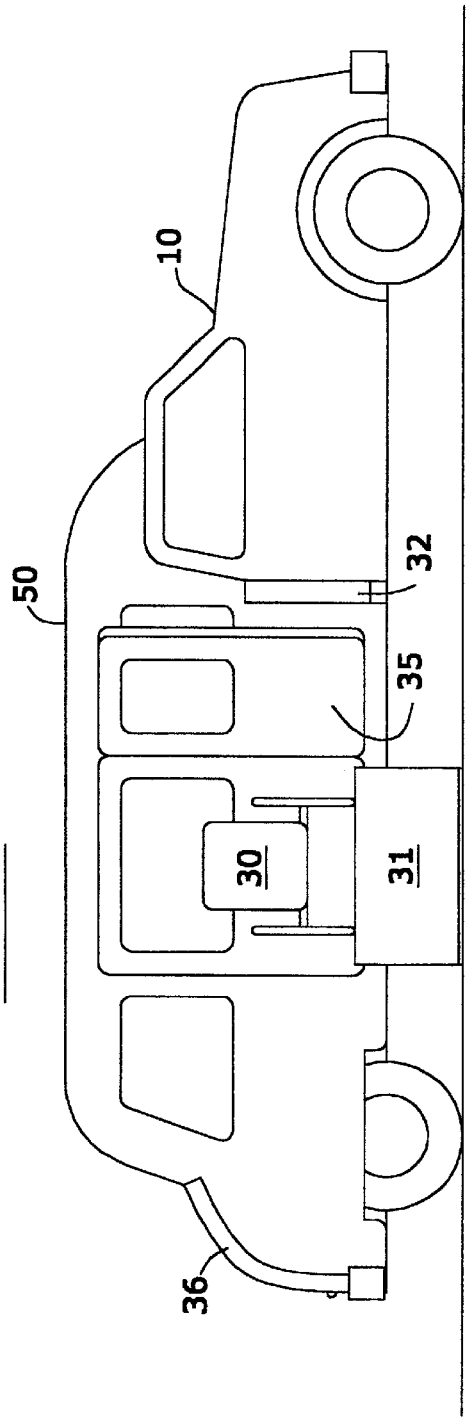
FIG. 8 is a partially schematic elevational view showing deployment of a ramp for receiving or delivering a wheelchair passenger.

As best shown in FIGS. 7 and 8, a principal passenger seat 25 preferably mounts to face rearward in passenger cabin 50 behind cab 10. This allows a back rest 26 to provide support for passengers against any forward collision. The flat floor support region 16 of frame extension 15 extends aft from principal passenger seat 25 for a sufficient distance before reaching rear axle clearance region 17 to accommodate a passenger in a wheelchair 30. For this purpose, passenger door 35 opens wide enough to admit passage of wheelchair 30 into and out of passenger cabin 50. Once on board, wheelchair 30 is preferably fastened in place with tie downs recessed into the floor of cabin 50.

A secondary passenger seat 28 is preferably arranged on rear axle clearance region 17 to face forward. Behind seat 28 is preferably a luggage compartment 29 that is accessible by a trunk lid 36.

A ramp 31 used for ingress and egress of wheelchair 30 is preferably formed of bullet-resistant material and when not in use is securely stored by the driver in a ramp pocket 32 arranged behind cab 10 and forward of principal passenger seat 25. This helps protect a driver in cab 10 from gunfire from cabin 50. A rear window (not shown) of cab 10 is also preferably made of bullet-resistant material and includes a money tray that is slideable back and forth for use by passengers and the driver. An intercom system is also preferred between cab 10 and cabin 50.

Figure 9:
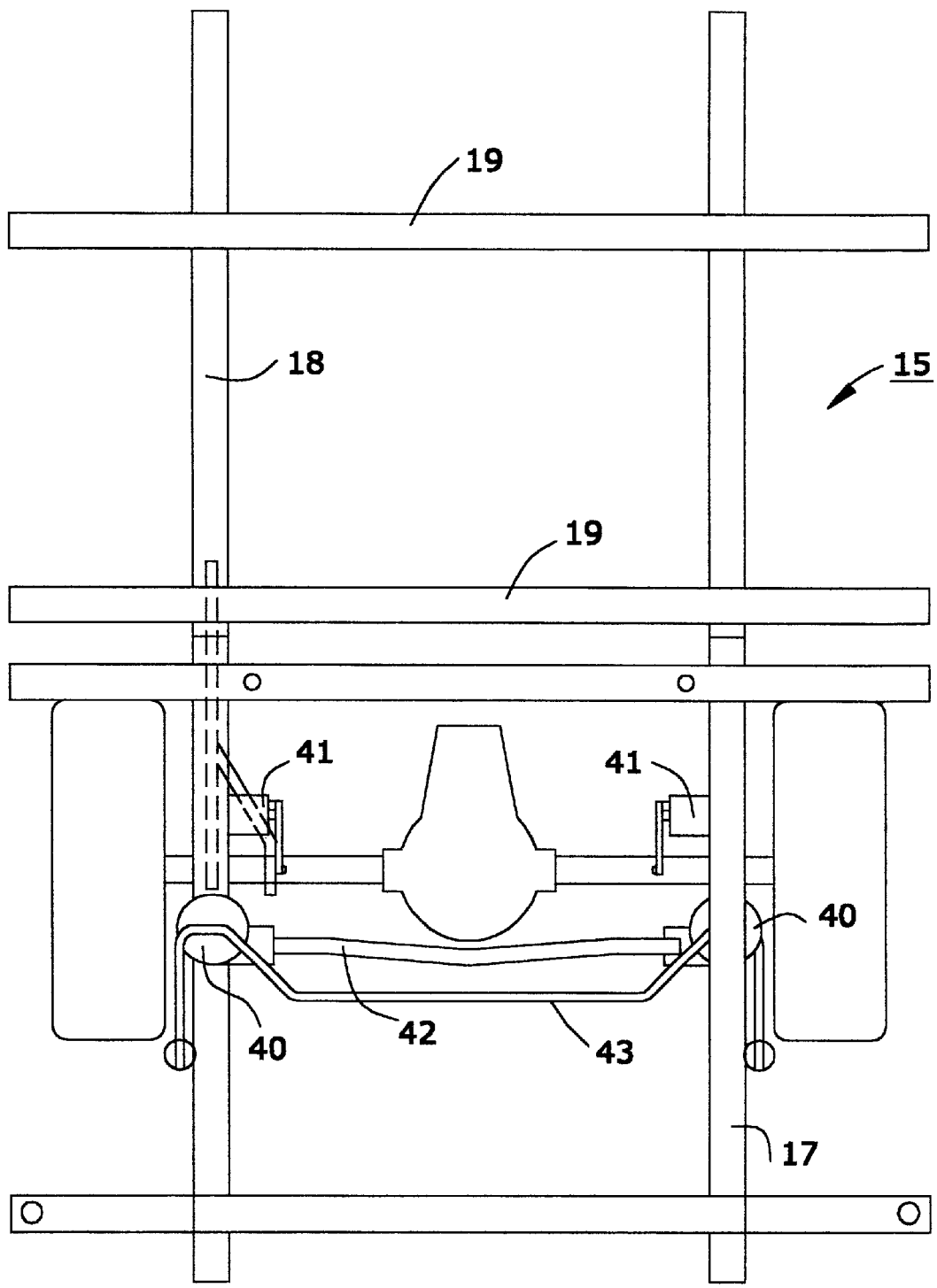
FIG. 9 is a plan view of an extended frame according to the invention provided with a rear axle suspension system.
Figure 10:
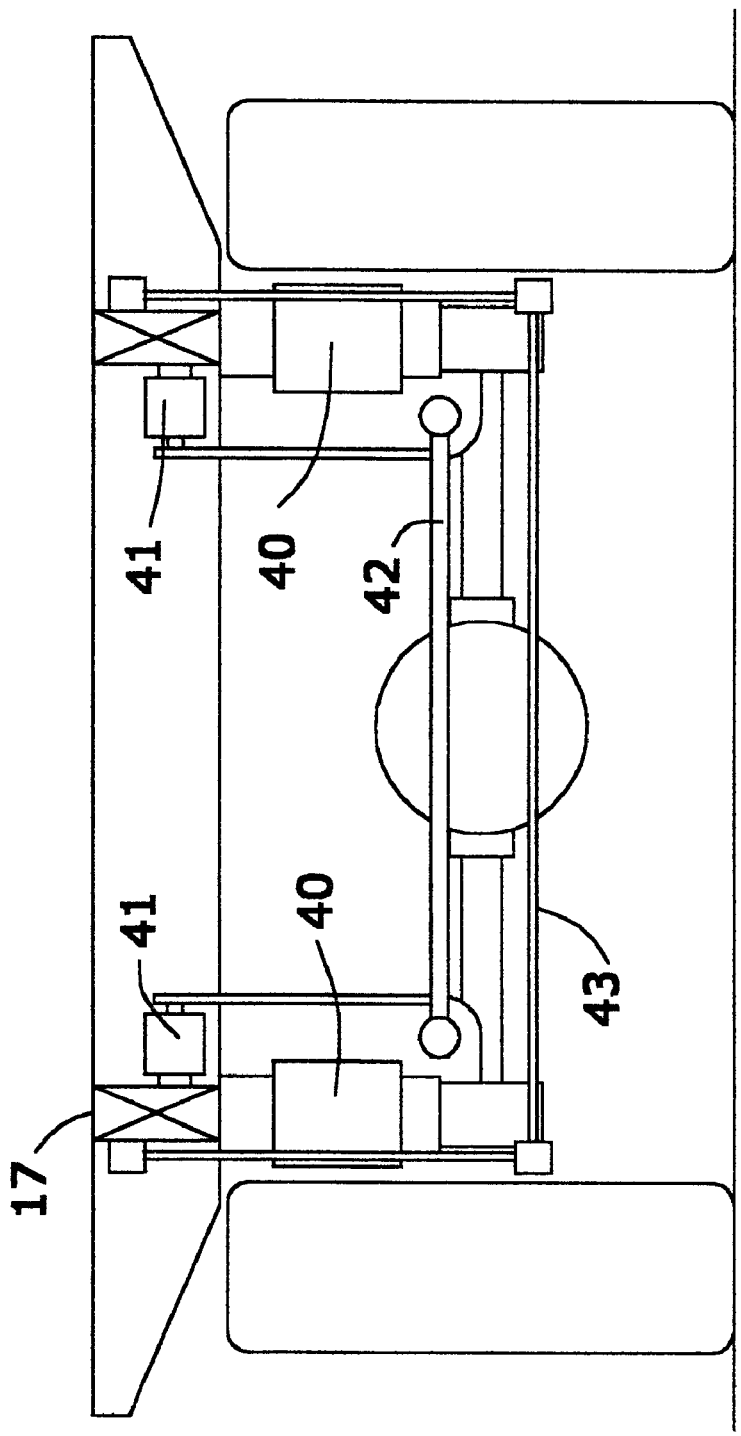
FIG. 10 is a rear view of the rear axle suspension system of FIG. 9.
Figure 11:
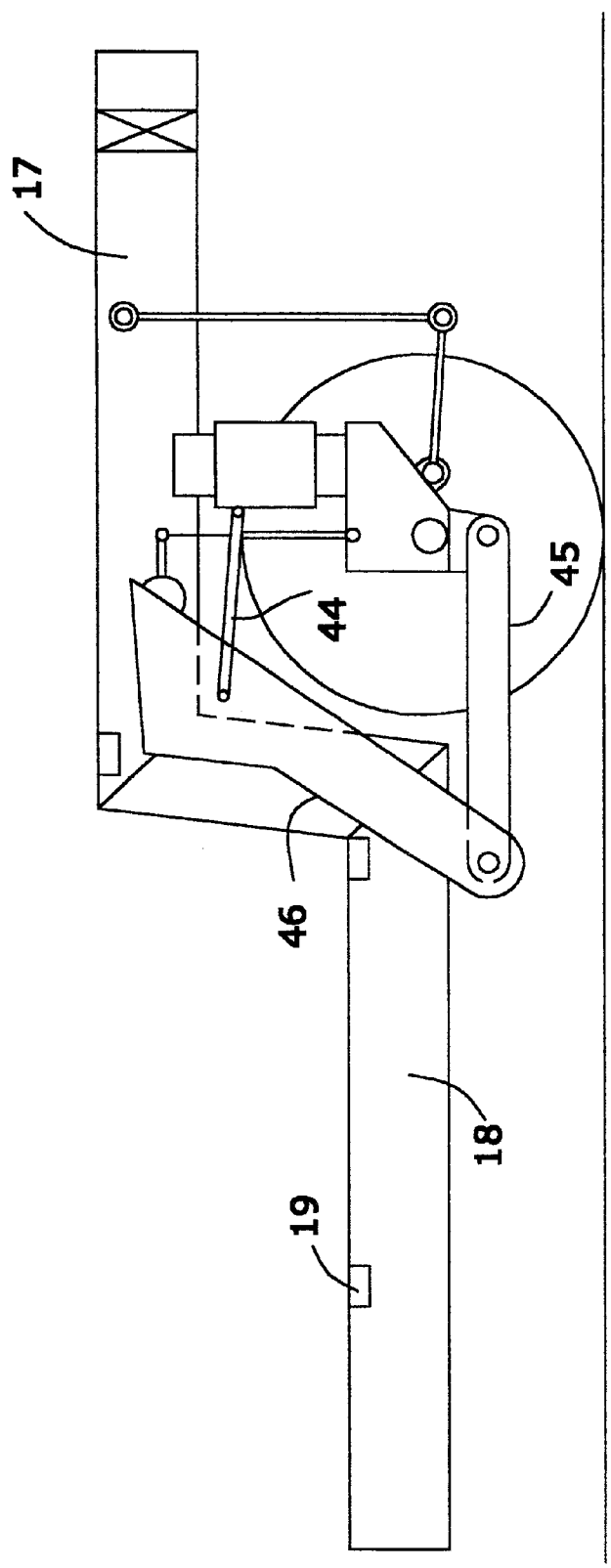
FIG. 11 is a side view of the extended frame and rear axle suspension system of FIGS. 9 and 10.

A rear axle suspension arranged under rear axle clearance region 17 is best shown in FIGS. 9–11. It preferably includes a pneumatic suspension using air springs 40 and automatic leveling units 41. This affords a smooth and durable ride and also allows the rear end of vehicle 20 to kneel down to lower the cabin floor level for receiving or delivering wheelchair passengers. The rear suspension also preferably includes panhard rod 42 and sway bar 43. The rear suspension side view of FIG. 11 shows how these elements can be arranged with an upper control arm 44 and a lower control arm 45 mounted to side rail straps 46 to afford a compact suspension. The preferred rear axle suspension shown in FIGS. 9–11 is much more compact than the original leaf spring suspension for the rear axle of a pickup truck so that it can work effectively within rear axle clearance region 17 aft of flat floor region 16. Many other rear axle suspension systems are also possible, so long as they can be confined within rear axle clearance region 17 and not invade flat floor region 16.

Adapting a vehicle to taxicab and livery purposes as illustrated and explained above also facilitates many safety and convenience features. For example, an air conditioning unit for passenger cabin 50 can be arranged between a pair of rear-facing principal passenger seats 25 to be controlled by passengers. A compressed air tank can be arranged under one of the principal passenger seats 25, and cabin 50 can hold at least as many passengers as a conventional sedan taxi. Safety lights are preferred around cabin 50 and passenger door 35. The ability to accommodate one or two wheelchair passengers greatly improves the usefulness of vehicle 20 for passenger carrying purposes.

Passengers will be encouraged by the availability of greater comfort to sit in the principal passenger seat where they will be better protected against any forward collision. Meanwhile, the driver is also protected by bullet-resistant barriers between cabin 50 and cab 10.

I claim:
1. A vehicle including a pickup truck cab and frame comprising:
   a. an extended frame connected to a portion of an original frame supporting the cab, the extended frame extending farther aft of the cab than the original frame;
   b. the extended frame having a flat level region between a rear wall of the cab and a rear axle clearance region;
   c. a passenger cabin separate from the cab mounted on the extended frame aft of the cab so that a front wall of the passenger cabin is spaced from the rear wall of the cab;
   d. at least one rear-facing passenger seat arranged in a forward portion of the passenger cabin aft of the rear wall of the cab so that a passenger sitting in the seat faces aft and is supported against a back rest offering protection from a forward collision; and
   e. the flat level region of the extended frame supporting a floor of the passenger cabin aft of the rear facing passenger seat and forward of the rear axle clearance region wide enough to accommodate a wheelchair.

2. The vehicle of claim 1 wherein the flat level region of the extended frame is as low to the ground as the original frame portion supporting the cab.

3. The vehicle of claim 1 wherein the rear axle clearance region of the extended frame is formed as a step having an abrupt rise from the flat level region.

4. The vehicle of claim 3 wherein a rear axle suspension system significantly more compact than a leaf spring suspension is connected to the rear axle clearance region to support a rear axle of the vehicle.

5. The vehicle of claim 4 wherein the rear axle suspension system is pneumatic.

6. The vehicle of claim 1 including a secondary passenger seat arranged within the passenger cabin above the rear axle clearance region.

7. The vehicle of claim 1 including a ramp removable from a stored position between the rear wall of the cab and the rear-facing passenger seat to permit a wheelchair to enter or exit the cabin.

8. The vehicle of claim 7 wherein the removable ramp is bullet resistant to protect a driver in the cab from gunfire directed toward the cab from inside the passenger cabin.

9. The vehicle of claim 1 wherein the extended frame is formed of box beams having wider top surfaces than top surfaces of the original frame portion formed of channels.

10. The vehicle of claim 9 wherein the box beams of the extended frame are arranged within the channels of the original frame portion where the box beams are secured in place by weldments.

11. A livery vehicle using a pickup truck cab and a portion of an original pickup truck frame supporting the cab, the vehicle comprising:
   a. an extended frame connected by a weldment to the portion of the original frame supporting the cab, the extended frame extending farther aft from the cab than the original frame;
   b. the extended frame forming a flat region at the level of the original frame under the cab, the flat region extending aft of the cab to a rear axle clearance region formed as a step having an abrupt rise from the flat region;
   c. a passenger cabin separate from the cab and having a front wall spaced aft of a rear wall of the cab and having a flat floor supported by the flat frame region forward of the rear axle clearance region;
   d. a principal passenger seat positioned inside the passenger cabin behind the cab so that passengers sitting in the principal seat face aft and are well supported against a back rest protecting them from injury that may result from a forward collision;

e. the flat floor of the passenger cabin extending far enough aft of the principal seat to accommodate a wheelchair; and f. a rear axle suspension system arranged within the rear axle clearance region.

12. The vehicle of claim 11 wherein the rear axle suspension system is pneumatic.

13. The vehicle of claim 11 including a door in the passenger cabin that is wide enough to accommodate a wheelchair.

14. The vehicle of claim 11 including a secondary passenger seat arranged on the rear axle clearance region to face forward.

15. The vehicle of claim 11 including a bullet-resistant, removable ramp that is stored between a rear wall of the cab and the principal passenger seat when the ramp is not being used to facilitate ingress and egress of passengers to and from the passenger cabin, so that when stored, the ramp protects cab occupants from gunfire that may be directed toward the cab from inside the passenger cabin.

* * * * *